US008131210B2

(12) United States Patent  
Couper

(10) Patent No.: US 8,131,210 B2  
(45) Date of Patent: *Mar. 6, 2012

(54) METHOD AND SYSTEM FOR DEPLOYING A WIRELESS REPEATER

(75) Inventor: Christopher C. Couper, Sacramento, CA (US)

(73) Assignee: International Business Machines Corporation, Armonk, NY (US)

(*) Notice: Subject to any disclaimer, the term of this patent is extended or adjusted under 35 U.S.C. 154(b) by 381 days.

This patent is subject to a terminal disclaimer.

(21) Appl. No.: 12/431,392

(22) Filed: Apr. 28, 2009

(65) Prior Publication Data

US 2009/0209200 A1 Aug. 20, 2009

Related U.S. Application Data

(63) Continuation of application No. 10/928,347, filed on Aug. 27, 2004, now Pat. No. 7,546,094.

(51) Int. Cl.
*H04B 3/36* (2006.01)
*H04B 7/15* (2006.01)
*H04B 7/14* (2006.01)
*H04B 17/00* (2006.01)

(52) U.S. Cl. ............ 455/11.1; 455/7; 455/16; 455/67.11

(58) Field of Classification Search .................. 455/3.01, 455/3.06, 66.1, 344, 7, 11.1, 16

See application file for complete search history.

(56) References Cited

U.S. PATENT DOCUMENTS

| | | | |
|---|---|---|---|
| 3,825,829 A | 7/1974 | Braun | |
| 5,633,876 A | 5/1997 | Dinkins | |
| 5,668,562 A | 9/1997 | Cutrer et al. | |
| 5,832,365 A | 11/1998 | Chen et al. | |
| 5,875,179 A | 2/1999 | Tikalsky | |
| 6,282,183 B1 | 8/2001 | Harris et al. | |
| 6,347,236 B1 | 2/2002 | Gibbons et al. | |
| 6,400,968 B1 * | 6/2002 | White et al. | 455/572 |
| 6,999,725 B2 * | 2/2006 | Nitta et al. | 455/63.1 |
| 7,076,252 B1 * | 7/2006 | Hirvonen | 455/446 |
| 7,079,808 B2 | 7/2006 | Striemer | |
| 7,171,223 B2 | 1/2007 | Herscovich et al. | |
| 7,177,650 B1 * | 2/2007 | Reiger et al. | 455/453 |
| 7,205,992 B2 | 4/2007 | Howard | |
| 7,224,667 B2 * | 5/2007 | Lete | 370/216 |

(Continued)

FOREIGN PATENT DOCUMENTS

JP 11112401 A 4/1999

(Continued)

*Primary Examiner* — Tilahun B Gesesse

(74) *Attorney, Agent, or Firm* — Novak Druce + Quigg LLP

(57) ABSTRACT

A method (200) of dynamically deploying wireless repeaters in a communication network can include establishing (205) a first wireless repeater serving as a communication node, evaluating (210) quality of a signal dynamically among at least one additional repeater being deployed in the communication network and the communication node, and selectively entering (215) a vertical unit in one of the additional repeaters being deployed. Evaluating the quality can include measuring (211) a signal strength from other repeaters in the communication system or measuring (212) a signal strength from a nearest repeater among the other repeaters in the system. Evaluating can also include pinging (213) the communication node. The vertical units can be entered as an input using any number of input devices including, but not limited to a keypad, a rotary switch (22 and 24), a voice recognition system or any combination thereof.

7 Claims, 2 Drawing Sheets

U.S. PATENT DOCUMENTS

| | | | |
|---|---|---|---|
| 2002/0028655 A1* | 3/2002 | Rosener et al. | 455/16 |
| 2003/0220075 A1* | 11/2003 | Baker et al. | 455/17 |
| 2004/0110466 A1* | 6/2004 | Perlman | 455/12.1 |
| 2004/0185794 A1* | 9/2004 | Jeong et al. | 455/78 |
| 2004/0203706 A1* | 10/2004 | Dietz et al. | 455/422.1 |
| 2004/0229563 A1* | 11/2004 | Fitton et al. | 455/7 |
| 2005/0020203 A1* | 1/2005 | Losh et al. | 455/11.1 |
| 2006/0084379 A1* | 4/2006 | O'Neill | 455/25 |
| 2006/0183421 A1 | 8/2006 | Proctor et al. | |
| 2006/0209847 A1 | 9/2006 | Binder | |
| 2007/0060047 A1 | 3/2007 | Ono | |
| 2007/0224931 A1 | 9/2007 | Fitton et al. | |

FOREIGN PATENT DOCUMENTS

| | | |
|---|---|---|
| JP | 2000-236292 A | 8/2000 |
| JP | 2003229810 A | 8/2003 |
| JP | 2004032393 A | 1/2004 |

* cited by examiner

METHOD AND SYSTEM FOR DEPLOYING A WIRELESS REPEATER

This application is a continuation of, and accordingly claims the benefit of, U.S. patent application Ser. No. 10/928,347, now issued U.S. Pat. No. 7,546,094, which was filed on Aug. 27, 2004, and which is hereby incorporated by reference in its entirety.

BACKGROUND OF THE INVENTION

1. Technical Field

This invention relates to the field of wireless repeaters, and more particularly to a method and system for deploying a communication network using wireless repeaters.

2. Description of the Related Art

Emergency services organizations will soon have the option of creating dynamic radio (ad hoc networking) networks in structures and in wildland scenarios such as wildland fires. Each radio in the dynamic radio network can function as a repeater for network communications. If the radio devices are not uniformly distributed (by radios moving about on persons and vehicles), a coverage grid of the dynamic network will have dead spots resulting in poor or incomplete coverage. Therefore, the deployment of multiple repeaters can be necessary in order to assure complete coverage within the grid.

When these repeaters are deployed dynamically (particularly in an emergency) there currently are no means of rapidly assuring complete coverage within the grid. In addition, while many conventional ad hoc networking technologies provide for some form of horizontal and vertical location information, none of them provide floor level accuracy. This is because of the accuracy of the vertical resolution creates uncertainties to what floor the device is on (based on distance) as well as the fact that floors in buildings are not uniformly spaced or necessarily counted (many buildings skip assigning a floor level due to cultural superstitions or otherwise, for example some buildings do not include a $4^{th}$ or a $13^{th}$ floor).

No known system provides for an optimized dynamic placement of radio repeaters nor do they provide for a floor indication capability. Most existing techniques are generally used to create an ideal overall network for later placement (rather than dynamically) or are specific radio techniques to repeat signals in building. For example, U.S. Pat. No. 5,668,562 to Cutrer, et. al. (Cutrer) discusses the placement of a set of test antennas in a building and then using the measurements from the test antennas to create an optimized network of fixed antennas established at indicated locations within the building. Cutrer also teaches using previously compiled placement data as a starting point for determining placements of fixed antenna within a new building, where the new building is similar to a previously tested building, and where the previously compiled placement data was for the previously tested building.

Note, according to Cutrer, the device to be deployed itself is not doing the measurement and measurements are not taken in real-time. Additionally, Cutrer has a goal of creating an ideal network for the building rather than creating an efficient and rapidly deployed network for a current (emergency) need. Cutrer also fails to provide devices that are self-sampling and instead uses the results of a test network. Furthermore, Cutrer fails to provide the capability of 'knowing' its vertical placement (i.e., floor).

Other repeater systems as found in U.S. Pat. No. 3,825,829 generally discusses the concept of using radio repeaters in buildings and again fails to discuss a dynamic deployment of repeaters having an ability to easily catalog and broadcast what floor they are on. Another repeater system in U.S. Pat. No. 5,832,365 discusses the phase shifting of signals and the selection of antenna patterns in statically deployed in-building networks. Once again, this patent fails to discuss real-time sensing and ideal placement of real-time deployments nor the ability to indicate floor levels or vertical units.

SUMMARY OF THE INVENTION

Embodiments in accordance with the invention can enable a method and system for dynamically deploying repeaters as well as optionally cataloging vertical units or floor levels in accordance with embodiments of the present invention.

In a first embodiment in accordance with the invention, a method of dynamically deploying wireless repeaters in a communication network can include the steps of establishing a first wireless repeater serving as a critical communication node, evaluating the quality of a signal dynamically among an additional repeater being deployed and the critical node and other repeaters in the communication network, and selectively entering a vertical unit for storage in the additional repeater being deployed. The step of evaluating the quality can include the steps of measuring signal strength from other repeaters in the communication system or measuring signal strength from a nearest repeater among the other repeaters in the communication system. The step of evaluating can also include the step of pinging the critical node, which can be done in a survey mode of the additional repeater. The vertical units can be entered as an input using any number of input devices including, but not limited to a keypad, a rotary switch, a touch screen, a slider switch, a voice recognition system, or any combination thereof. Further note that the vertical units can be floor levels.

In a second embodiment in accordance with an embodiment of the invention, a dynamically deployable wireless repeater in a communication network can include a transceiver and a processor coupled to the transceiver. The processor can be programmed to evaluate the quality of a signal dynamically between the transceiver and a first repeater in the communication network serving as a critical node and between the transceiver and other repeaters in the communication network, and further programmed to selectively receive and store an input indicative of a vertical unit. The processor can evaluate the quality by measuring signal strength from other repeaters in the communication system or by measuring signal strength from a nearest repeater among the other repeaters in the communication system. The processor can also evaluate the quality by pinging the critical node, which can all be done during a survey mode of the repeater. The processor can also be programmed to selectively receive the input indicative of the vertical unit by using an input device selected among a keypad, a rotary switch, a touch screen, a slider switch, a voice recognition system, or any combination thereof. As noted above, the vertical unit can indicate a floor level.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Embodiments in accordance with the present invention provide for a mechanism to determine on an ad hoc basis where an ideal placement for proper reception can be. Other embodiments can also provide a means for efficiently and accurately indicating what floor a repeater being deployed is on to support an accurate floor level location determination. Such a floor level determination is useful in many emergency or combat situations as well as other situations requiring dynamically deployable ad hoc communication network.

Figure 1:
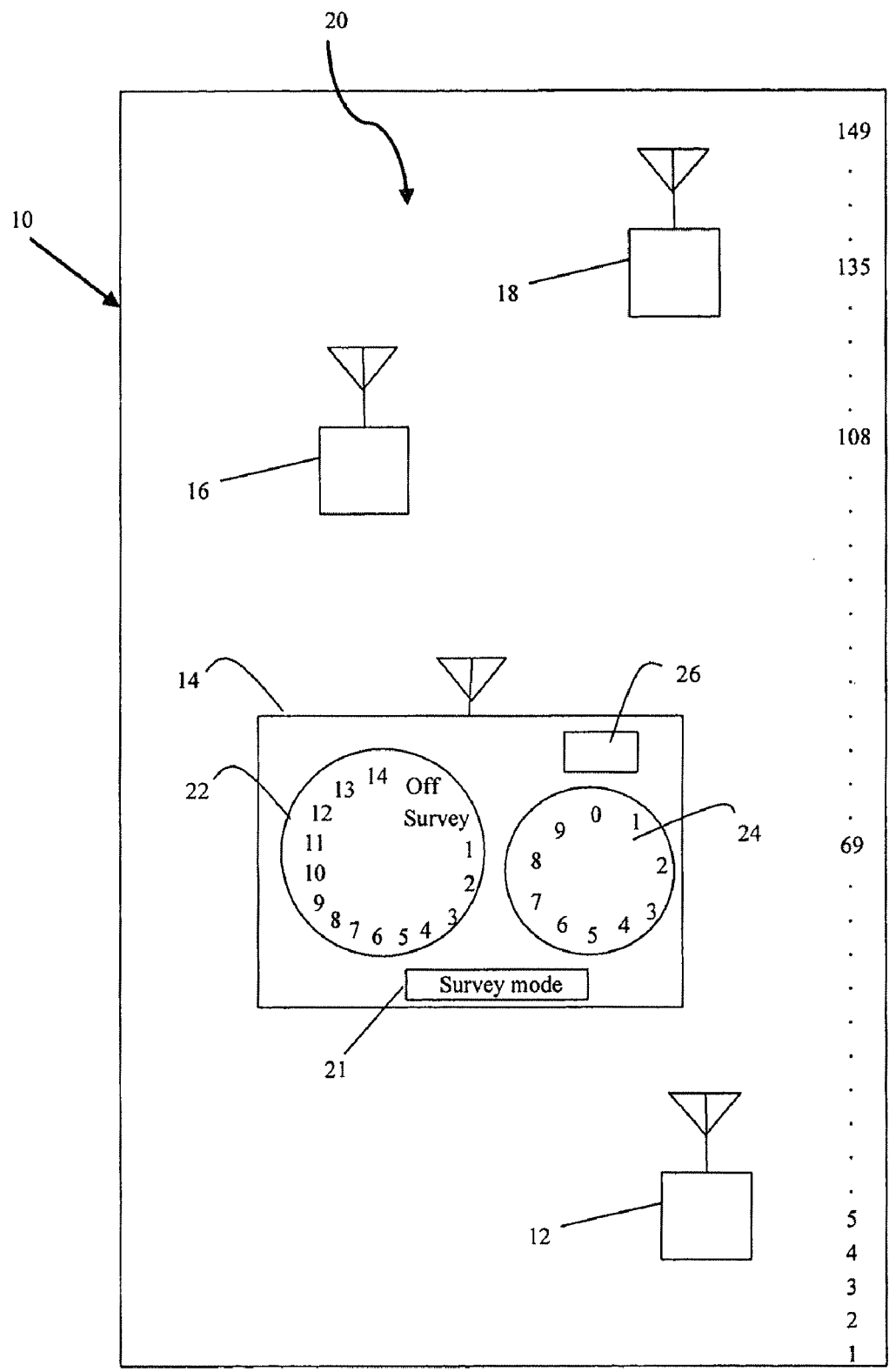
FIG. 1 is a schematic diagram illustrating a system for dynamically deploying a wireless repeater in a communication network in accordance with an embodiment of the present invention.

Referring to FIG. 1, a building 10 having a hypothetical 149 floors is shown having a plurality of repeaters in a communication system 20. A first repeater or communication node 12 is shown deployed on the fifth floor. This communication node 12 can be a reference node or a critical node 12 for the communication system 20. The first repeater and other repeaters in the system can be self powered either by a battery, fuel cell or by some other on-device source. Other repeaters 16 and 18 can be deployed throughout the building.

In one embodiment, a repeater 14 being currently deployed on a $69^{th}$ floor can have a monitoring capability based on signal strength and pings to the communication node 12 that further evaluates the connection to other radio repeaters (not end user devices and non repeater devices). The system 20 can evaluate the network at all times while it is in a survey mode. The evaluation can measure the signal strength to nearest repeaters as well as send or receiver a ping message to a critical node. The person deploying the repeater 14 can be given feedback in the form of audible and/or visible indications as to the quality of both parameters using a speaker 26 or display 21 respectively. As soon as one or both indications fall below a critical level the system can prompt the user (audibly and/or visually) to deploy the repeater 14. The user can then turn the repeater 14 'on' and pick up another repeater and continue the process as they build the network dynamically.

In one embodiment, the modes of the repeater can include an Off mode when no electrical activity is associated with the device, a Survey/Standby mode when the device (the repeater) only communicates to other repeaters solely to determine where it should be ideally deployed to maximize coverage without compromising throughput/connectivity, and an On mode (which can have one of 149 floor settings in this example).

The modes are controlled by any number of interfaces that can include a variety of input mechanisms. In one embodiment, the modes can be controlled by two tunable knobs (approximately 1 cm high and 1 cm diameter). A first knob 22 can have 16 positions (off, survey, and 0-14). The 0-14 settings indicate the tens values of the placement floor. This is for a 16 position rotary switch. More positions allow for more floors. The second dial 24 can be a ten position (0-9) rotary switch. The rotary dials or other inputs can indicate unit values of the placement floor. For example, floor 108 would be represented by knob 22 at the 10 indicator and knob 24 at the 8 indicator. It should be appreciated that the input mechanism are not limited to the use of tunable knobs and that any suitable input mechanisms, such as a voice input, can be used.

An LED or the display 21 can show the signal strength (bars) while in standby mode or a word (Deploy) when ready to deploy. While the first knob 22 is in positions 3-16, the floor can be displayed for a brief period of time such as one minute (anytime the either knob is turned) and then go out to save power. An audible beep can indicate the device is in standby mode and will beep slowly when in excellent range (meeting the criteria outlined above) and beep faster until it is a steady tone to indicate the device should be deployed. When turning either knob for a numeric (floor) the device can say its floor number (using synthesized speech after waiting for a brief period such as ½ second), otherwise the device is silent.

Using this enhancement to the repeaters allows for the ideal and proper network deployment and provides an exact indication of the floor the device was deployed on without having to determine the floor value mathematically with its associated errors. This is critical when the devices are used to locate deployed resources (such as fire personnel who may be in trouble).

With regard to vertical indicators, vertical units can be defined to be floor levels. The actual units can also be determined by an associated asset (e.g., computer applications or fixed device). The indicator can display the status (off, standby/survey, vertical units) as well as provide other appropriate information. The vertical units can also be positive or negative (for underground floors for example).

Figure 2:
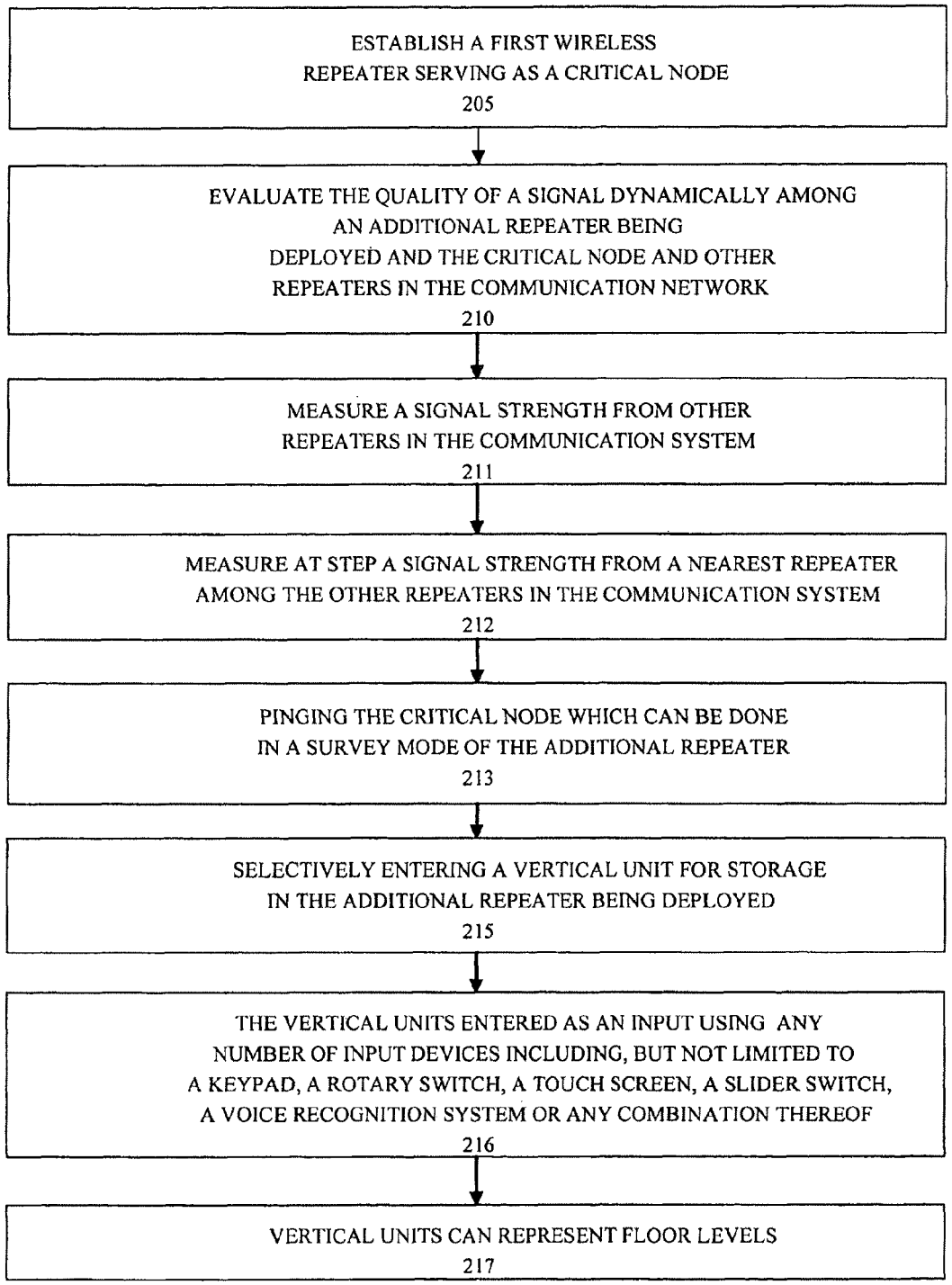
FIG. 2 is a flow chart illustrating a method of dynamically deploying wireless repeaters in a communication network in accordance with an embodiment of the present invention.

Referring to FIG. 2, a flow chart illustrating a method 200 of dynamically deploying wireless repeaters in a communication network can include the step 205 of establishing a first wireless repeater serving as a critical or reference communication node, evaluating the quality of a signal dynamically among an additional repeater being deployed and the critical node and other repeaters in the communication network at step 210, and selectively entering a vertical unit for storage in the additional repeater being deployed at step 215. The step of evaluating the quality 210 can include the step 211 of measuring a signal strength from other repeaters in the communication system or measuring at step 212 a signal strength from a nearest repeater among the other repeaters in the communication system. The step of evaluating can also include the step 213 of pinging the critical node, which can be done in a survey mode of the additional repeater. The vertical units can be entered as shown at step 216 as an input using any number of input devices including, but not limited to, a keypad, a rotary switch, a touch screen, a slider switch, a voice recognition system or any combination thereof. Further note that the vertical units can be floor levels for example as indicated at step 217.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A dynamically deployable wireless repeater in an ad hoc communication network, comprising:
   a transceiver; and
   a processor coupled to the transceiver, wherein the processor is programmed to:
      using said transceiver, dynamically evaluate a quality of a signal between a first active repeater in the communication network serving as a critical communication node and one or more other active repeaters deployed in the communication network, the evaluation including measuring signal strength from the other active repeaters in the communications network, and measuring a signal strength from a nearest repeater among the other active repeaters in the communications network; and
      responsive to said quality falling below a critical level, activate said deployable wireless repeater and selectively receive and store an input indicative of a vertical unit, said stored vertical unit identifying a floor level of said activated repeater.

2. The repeater of claim 1, wherein the processor evaluates the quality by pinging the critical communication node.

3. The repeater of claim 1, wherein the processor selectively receives input indicative of the vertical unit using at least one input device selected from the group consisting of a keypad, a rotary switch, a touch screen, a slider switch, and a voice recognition system.

4. A non-transitory computer-readable storage, having stored thereon a computer program having a plurality of code sections executable by a computer for causing the computer to perform the steps of:
   establishing a communications network using one or more active repeaters, and wherein one of said active repeaters serves as a critical communications node;
   for each of a plurality of inactive repeaters deployed in said network, evaluating a quality of a signal between said critical node and at least one other of said active repeaters in the communication network, said evaluating step including at least one of:
      measuring a signal strength from other active repeaters in the communications network; and
      measuring a signal strength from a nearest repeater among the other active repeaters in the communications network;
   responsive to said quality falling below a critical level, activating said inactive repeater and selectively entering a vertical unit for signal reception in said activated repeater, said entered vertical unit identifying a floor level of said activated repeater.

5. The non-transitory computer-readable storage of claim 4, further comprising code sections for evaluating the quality by pinging the communication node.

6. The non-transitory computer-readable storage of claim 4, further comprising code sections for:
   responsive to relocating said inactive wireless repeater, repeating the steps of evaluating, activating, and entering.

7. The non-transitory computer-readable storage of claim 4, further comprising code sections for:
   pinging the activated repeater; and
   responding to said ping with said entered vertical unit for said activated repeater.

* * * * *